Figure 1:
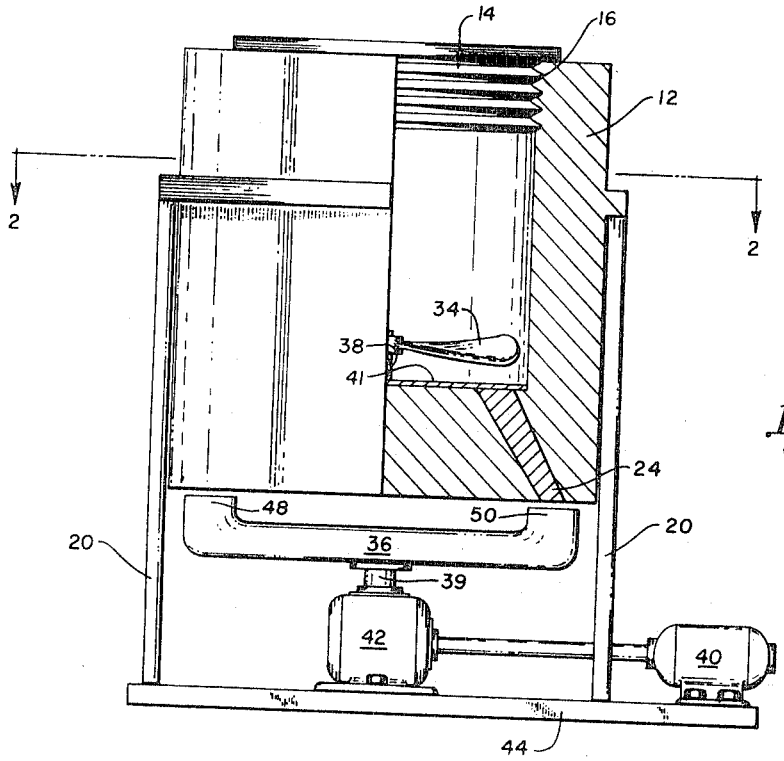
Figure 2:
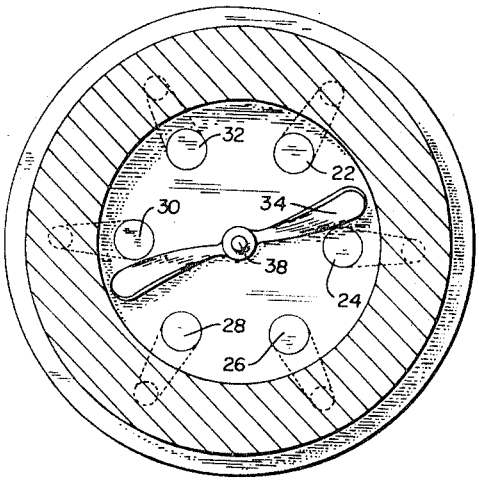
Figure 3:
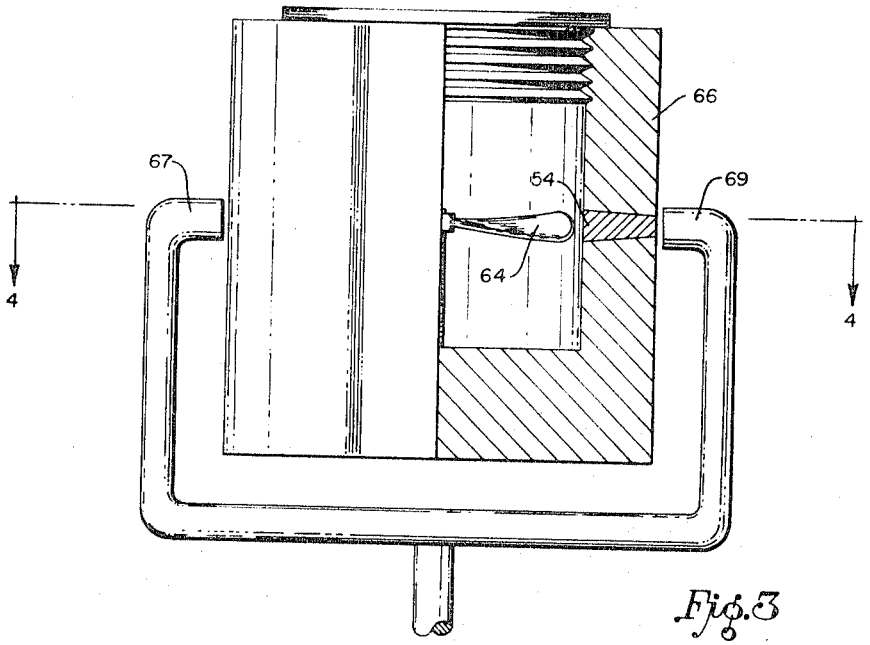
Figure 4:
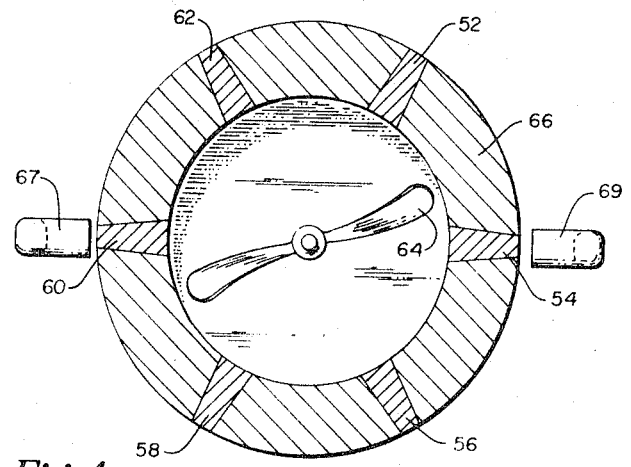
Figure 5:
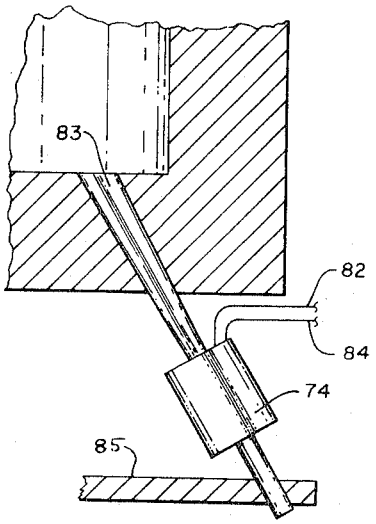
Figure 6:
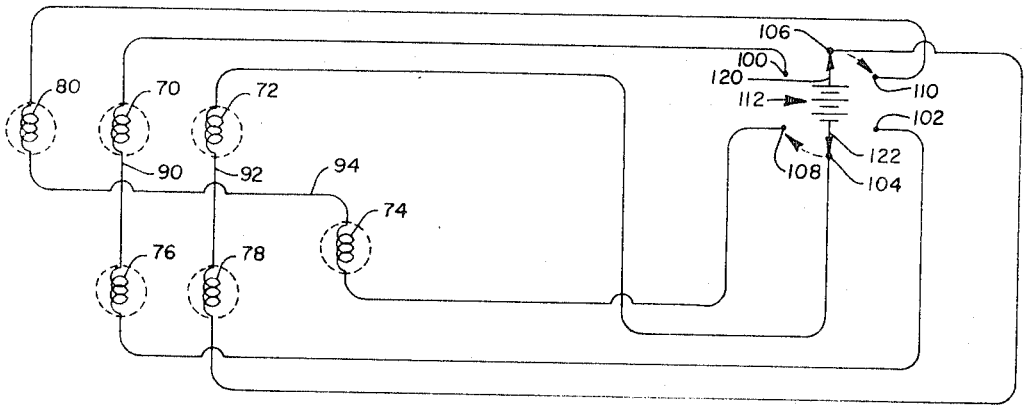

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 5, 1973

911 O.G. 7

T911,002
MAGNETIC TORQUE TRANSFER SYSTEM
James W. Henry, 3958 Skyland Drive, Kingsport, Tenn. 37664
Filed Sept. 9, 1971, Ser. No. 178,975
Int. Cl. B01f *13/08*
U.S. Cl. 259—108
3 Sheets Drawing. 9 Pages Specification

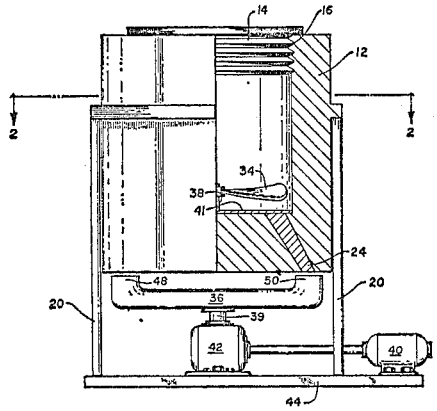

A magnetic torque transfer system is disclosed in which a magnetized driving member is coupled to a magnetized driven member through magnetic flux, wherein the members are separated by a reluctant shield, air gap, or both. The efficiency of the system is greatly increased by providing low reluctance, temporarily magnetizable elements between the magnetized driving and driven members, extending though the high reluctance shield or air gap. The efficiency may be further increased by the use of exciting coils on the elements. The system is particularly useful in autoclaves.

June 5, 1973

J. W. HENRY

T911,002

MAGNETIC TORQUE TRANSFER SYSTEM

Filed Sept. 9, 1971

3 Sheets-Sheet 1

JAMES W. HENRY
INVENTOR

BY Carl D. Gray Jr.
John F. Stevens
ATTORNEY

June 5, 1973 J. W. HENRY T911,002

MAGNETIC TORQUE TRANSFER SYSTEM

Filed Sept. 9, 1971 3 Sheets-Sheet 2

JAMES W. HENRY
INVENTOR.

BY Cecil W. Gastler
John F. Stevens
ATTORNEY

MAGNETIC TORQUE TRANSFER SYSTEM

Filed Sept. 9, 1971 3 Sheets-Sheet 3

JAMES W. HENRY
INVENTOR
BY Cecil D. Quillen Jr.
John F. Stevens
ATTORNEY